Sept. 22, 1970  G. E. CHRISTIANSEN  3,529,621

INTEGRAL STOP CONSTRUCTION FOR PLUMBING FITTING

Filed Oct. 4, 1967

INVENTOR.
G. E. CHRISTIANSEN
BY Robb & Robb
attorneys

United States Patent Office 3,529,621
Patented Sept. 22, 1970

3,529,621
INTEGRAL STOP CONSTRUCTION FOR PLUMBING FITTING
Gerald E. Christiansen, Flora, Ind., assignor to Stephen A. Young, Monticello, Ind.
Filed Oct. 4, 1967, Ser. No. 672,751
Int. Cl. F16k 5/18, 19/00
U.S. Cl. 137—315                                             1 Claim

ABSTRACT OF THE DISCLOSURE

This invention relates to plumbing fixtures or fittings and particularly to valves and construction thereof which includes an integral stop or stops to obviate the necessity of providing separate wall mounted stops or none at all except a main shut-off valve for an entire system. Further, the invention involves the provision of novel stop construction, availing of certain characteristics of materials from which elements are formed and structure which facilitates access and operation as well as eliminating leakage in the stop.

---

In the usual domestic plumbing fitting or fixture as the same are supplied for bathroom and kitchen use, it has heretofore been necessary to supply separate stop valves to which the fittings are connected so that replacement of washers or other repairs may be effected in the valve body without the necessity of shutting down the entire plumbing system. Under some circumstances, no stops are supplied in domestic systems because of the expense involved, and it is therefore not only inconvenient but under some circumstances nearly impossible to shut an entire system down merely to replace a washer or make some other minor repair.

To the foregoing end, therefore, this invention is directed to the construction of plumbing fittings or fixtures which incorporate within them what are known as integral stops, that is stops built into the control units so that it is not necessary to provide either wall mounted stops or to shut down an entire system to effect minor or major repairs.

One of the primary concepts of the invention resides in the provision of a very simply constructed stop arrangement which avails of the material from which the same is composed to effect a sealing action as between the potentially leaking areas and at the same time effect positive shut-off of the unit when it is desired to replace a washer in the main valve in which the stop is incorporated.

It is a principal object of the invention to provide a stop construction which avails of the form of valve member and material from which the same is constructed to effect a sealing of the unit when pressure is applied thereto by the admission of liquid thereinto which arrangement is effective both during the use of the main valve in which this unit is incorporated as well as shut off flow of water to such main valve when it is desired to replace a washer or make some other repair therewithin.

Another object of the invention is to provide an integral stop structure in which a valve member of simple form is provided and arranged so that the admission of fluid would effect a sealing action, and such member may be rotated or otherwise controlled to admit liquid into the main valve for regulation thereby or to shut off supply to such main valve as circumstances may dictate.

Another object of the invention is to provide stop construction in which the material from which a valve member is formed is of such nature as will obviate the necessity to supply additional sealing elements, and a snap ring is furnished to make possible the removal or replacement of the integral stop valve member itself as the occasion may demand.

Other and further objects of the invention will be understood from the consideration of the specification appended hereto and disclosed in the drawing wherein.

Figure 1:
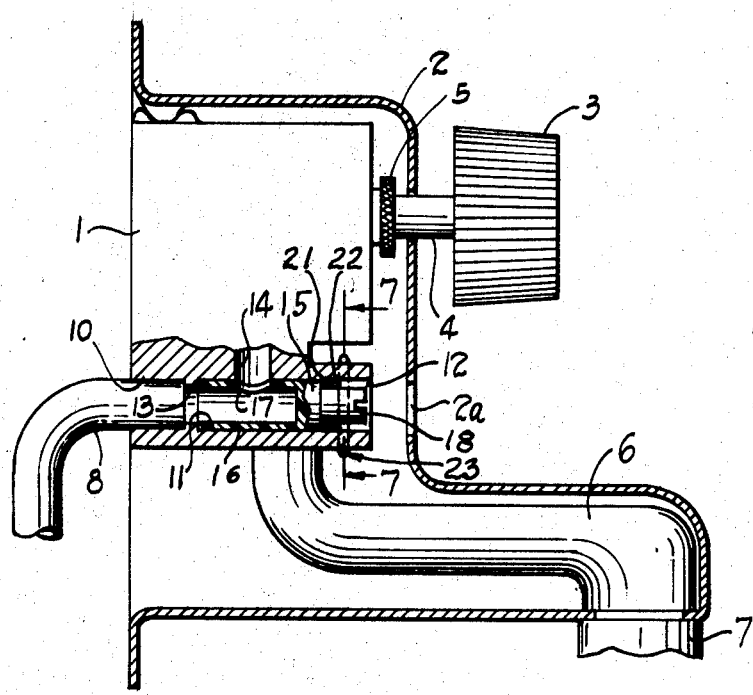
FIG. 1 is a vertical sectional view, showing a typical installation of the valve member used in such stop construction.
Figure 6:
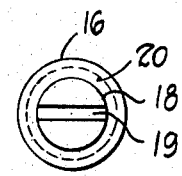
FIG. 6 is a view from the opposite end of FIG. 5 of said valve member.
Figure 5:
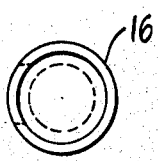
FIG. 5 is an end view of a valve member of FIG. 2.

Referring now to FIG. 1, the valve construction which may suitably incorporate the concept hereof is shown as comprising a valve body 1 of representative shape not specifically formed for the purpose hereof but primarily to illustrate the balance of the invention, supported within a shell or housing 2 which is of a suitable configuration so as to completely enclose the valve body 1 and its associated elements, a handle member 3 mounted on a stem 4 extending outwardly from such shell, the stem 4 in turn passing through a packing gland nut 5 and adapted to control within the valve body 1 the mixture of hot and cold water which is directed ultimately to the spout 6 and outwardly at the end 7 thereof as regulated by handle member 3 previously mentioned.

Figure 7:
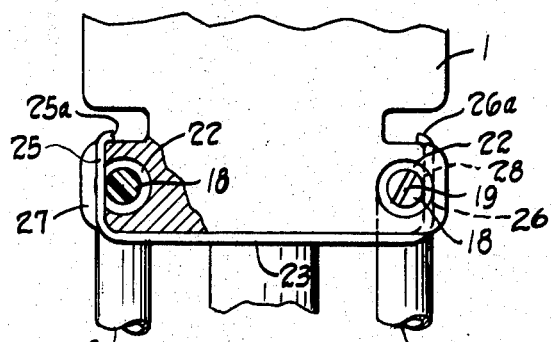
FIG. 7 is a front view, partly in section and in elevation taken on the line 7—7 of FIG. 1 looking in the direction of the arrows.
Figure 8:
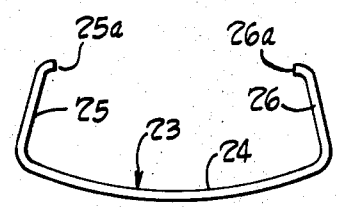
FIG. 8 is a plan view of a snap ring used in the valve construction.

As will be understood, the valve body 1 being a mixing valve in this particular instance, is connected to hot and cold water supplies such as the supply indicated at 8, there being a duplicate of the same at the opposite side of the body and not further referred to or illustrated herein except at FIG. 7 where the same is designated 9.

Since both supplies 8 and 9 are arranged in identical manner, the supply connection at 8 is hereindescribed in detail.

Supply 8 is arranged with copper connection tubing and sweated in an opening such as 10, which in turn is in alignment with a valve chamber 11, the latter extending through the body 1 toward an opening at 12.

The supply 8 is therefore connected to an inlet which is shown at 13, there being an outlet from the chamber 11 designated 14, which is in the normal path of travel of the liquid entering the supply 8, as for example in this instance hot water or the like in accordance with conventional practice for the position of such fluid entrance.

Figure 2:
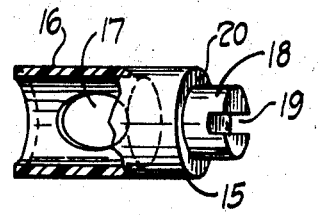
FIG. 2 is a perspective view of a valve member used in such stop construction.
Figures 3, 4:
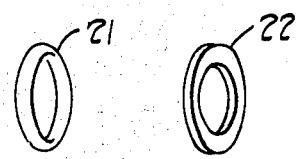
FIG. 3 is a sealing gasket which may or may not be used as desired.
FIG. 4 is a flat washer which may be used in conjunction with the sealing gasket to permit rotation of the valve member.

Within the chamber 11, there is shown the stop valve member of this invention, same being illustrated in further detail in FIG. 2 in some respects, as comprising head portion 15 being circular in cross section, integrally formed with a tubular portion 16 extending toward the inlet 13, a port 17 leading radially from the tubular portion 16, and thereby providing communication along the inlet 13 and interiorly of the tubular portion 16 but adapted to be moved into alignment with the outlet 14 upon rotation of the body now being described.

Extending from the portion 15 is a means for rotating the member comprising a reduced section 18 at the extremity of which there is a transverse slot 19 adapted to receive a screwdriver or like implement for rotating purposes.

A shoulder 20 lies at the intersection of the portion 15 and part 18, such shoulder being adapted to support thereagainst a suitable sealing ring such as 21, said ring 21 in turn having placed thereagainst the washer 22 as illustrated in FIG. 1 when the valve member now being described is in place in the valve body 1.

As seen in FIG. 1, the valve member having been placed in the chamber 11, with the sealing ring 21 and washer 22 in place, is retained within said chamber 11 by means of a snap ring generally designated 23, which snap ring includes a transverse section 24 and upwardly extending arms 25 and 26, which terminate in the inwardly bent ends 25a and 26a respectively.

The body 1 at the area through which the valve chamber 11 extends, is formed about as shown in FIG. 7 so that by a suitable slotting operation, a slot such as 27 is formed to receive the end 25 of the snap ring 23.

A suitable similar slot 28 is provided at the opposite side to receive the end 26 of the snap ring 23, the snap ring thereby retaining the valve member by contacting the washer 22 permitting rotation of the member with respect to the chamber so that the port 17 may be brought into alignment with the outlet 14 or moved away from the same to shut off liquid flow through such outlet 14.

It should be understood that the valve member is formed of plastic material, preferably a polytetrafluorethylene so that the self-lubricating qualities of such plastic are availed of to permit ready rotation of the valve member as necessary and likewise since the wall thickness of the cylindrical portion of said valve member is of such a nature that the pressure will expand said wall member and thereby provide the necessary sealing between the chamber and said valve member and obviate leakage therearound.

While the disclosure illustrates sealing ring 21 and washer 22, it is clear that the same may be dispensed with if found desirable, relying upon the snap ring and the ends 25 and 26 thereof to engage the shoulder 20 of the valve member in each case, and retain the same against the pressure exerted therewithin, all the foregoing depending upon the tolerances involved in the manufacture of the valve as a whole and the preferred practice as found in actual use.

It will be understood that application of a screwdriver or like tool to the slot 19 may be resorted to as through an opening such as 2a in the member 2 to close the valve member hereintofore described in detail whereby suitable repairs or other purposes may be accommodated as necessary.

I claim:

1. In valve construction of the class described, in combination, a valve body, a pair of valve chambers each comprising a cylindrical section extending through the body, an inlet and an outlet for flow of fluid through such chambers, the inlet being at one end of the said section in each, the outlets extending radially intermediate the ends of each of the sections, a non-rising valve member positioned in each such chamber to control fluid flow therethrough, each such member including a wall constituting a tubular portion of flexible material, said wall being parallel to the axis and radially expansible into sealing engagement with the interior of the valve chamber by fluid pressure directed thereto whereby to prevent leakage around said member, each said member being rotatably mounted in its section with the open end thereof in communication with the inlet corresponding thereto, each said tubular portion having a port leading radially therefrom to facilitate fluid flow through the portion when said port is aligned with the corresponding outlet and shut off fluid flow when the respective member is rotated to move the port therein out of such alignment, the closed end of each tubular portion having a shoulder thereon, means for rotating each member extending therefrom for manipulation from the exterior of the body, the body being slotted adjacent the shoulder of each member, and a snap ring having a pair of end members each seated in one of the slots, and adjacent the corresponding shoulder to retain said valve members in operative position.

References Cited

UNITED STATES PATENTS

| 164,027 | 6/1875 | Patton | 251—312 XR |
| 2,832,562 | 4/1958 | Myers | 251—175 |
| 2,991,972 | 7/1961 | Busby | 251—175 |
| 3,103,231 | 9/1963 | Moen | 137—454.2 |
| 3,198,484 | 8/1965 | Martindale | 251—329 |
| 3,254,872 | 6/1966 | Roos | 251—312 XR |
| 3,323,874 | 6/1967 | Phillips | 251—368 XR |

ROBERT G. NILSON, Primary Examiner

U.S. Cl. X.R.

137—606; 251—175, 310, 312; 287—20.1